(12) United States Patent
Cranner et al.

(10) Patent No.: US 7,739,204 B1
(45) Date of Patent: Jun. 15, 2010

(54) AUTOMATED UNIFIED PRICING METHOD AND SYSTEM FOR IMPROVED PRICING OF A BUNDLE OF GOODS OR SERVICES

(76) Inventors: Bruce A. Cranner, 8 Tara La., Madeville, LA (US) 70471; Robert Docters, 75 Thayer Dr., New Canaan, CT (US) 06840; Tao Chen, 14 Ana La., Edison, NY (US) 08820

( * ) Notice: Subject to any disclaimer, the term of this patent is extended or adjusted under 35 U.S.C. 154(b) by 682 days.

(21) Appl. No.: 11/542,611

(22) Filed: Oct. 3, 2006

Related U.S. Application Data

(60) Provisional application No. 60/723,075, filed on Oct. 3, 2005.

(51) Int. Cl.
*G06F 17/00* (2006.01)
(52) U.S. Cl. .................................................... 705/400
(58) Field of Classification Search ................ 705/400, 705/1, 7, 10, 14, 30, 37, 26, 27; 703/2
See application file for complete search history.

(56) References Cited

U.S. PATENT DOCUMENTS

| | | | | | |
|---|---|---|---|---|---|
| 6,035,287 | A | * | 3/2000 | Stallaert et al. | 705/37 |
| 6,285,986 | B1 | * | 9/2001 | Andrews | 705/26 |
| 7,092,892 | B1 | * | 8/2006 | Sobalvarro et al. | 705/5 |
| 2002/0128910 | A1 | * | 9/2002 | Sakuma | 705/14 |
| 2009/0106165 | A1 | * | 4/2009 | Solomon | 705/80 |

OTHER PUBLICATIONS

W. J. Adams and J. L. Yellen; "Commodity Bundling and the Burden of Monopoly"; The Quarterly Journal of Economics; Aug. 1976; pp. 475-498; vol. 90; John Wiley & Sons, Inc.

* cited by examiner

*Primary Examiner*—Igor Borissov
(74) *Attorney, Agent, or Firm*—Raymond G. Areaux; Lisa Velez; Carver, Darden, Koretzky, Tessier, Finn, Blossman & Areaux, LLC

(57) ABSTRACT

An automated unified pricing method and system that allow companies to precisely calculate the price of a combination of products and/or services when those products or services are offered together in a bundle for a unified price are described. This methodology applies to the situation where there is some observable or predicted market value to the bundle elements sold individually, or to bundles which are a subset of a larger bundle being contemplated. The method and system determine linked usage correlation values to determine a core product of a pool of candidate products. The selection of the core product is maximized or optimized by eliminating substitutes from the pool and recalculating the linked usage correlation values. The unified price is calculated by multiplying the price (retail price) of each individual candidate product by the correlation coefficient related to the joint relationship of the core product and the respective candidate product to create adjusted prices for the candidate products. The adjusted prices are added together to determine the bundle value or unified price for the combined multiple product offer.

24 Claims, 5 Drawing Sheets

AUTOMATED UNIFIED PRICING METHOD AND SYSTEM FOR IMPROVED PRICING OF A BUNDLE OF GOODS OR SERVICES

CROSS REFERENCE TO RELATED APPLICATIONS

This application claims the benefit of the priority of U.S. provisional patent application 60/723,075 filed on Oct. 3, 2005.

BACKGROUND OF THE INVENTION

1. Field of the Invention

The present invention relates to product and/or service pricing, and particularly to an automated unified pricing method and system for calculating via a computer or other computing device, a unified price for a bundle of goods, services or a combination of goods and services using linked usage correlation values calculations for products of the bundle or combined multiple product offer (CMPO).

2. General Background

Today, all bundle prices are estimated through judgment or by market trial and error. One approach to estimate bundle prices is the use of cross-sell data to determine bundle components. However, the percentage of customers who have purchased e.g. two different products is not a good indication of bundle suitability. Cross-sell is, in most cases, a historical artifact of company sales efforts. I have determined that the cross-sell approach does not provide bundle pricing based on a correlation estimates indicative of purchase dynamics.

As can be readily seen, there is a continuing need for a mathematical formula that allows a computer or other computing device to calculate the value, and therefore provide a baseline for human adjustment, or for direct unified pricing of the bundle or CMPO.

Another continuing need is for a method to calculate a unified price which uses the pattern of joint purchases to develop a linked usage correlation value of those purchases wherein the correlation values among candidate products of the bundle are used to establish a unified price.

As will be seen more fully below, the present invention is substantially different in structure, methodology and approach from that of other pricing methods.

SUMMARY OF THE INVENTION

The present invention contemplates an automated pricing system for calculating a unified price for a bundle of products comprising: means for calculating a linked usage correlation value among candidate products of a pool of candidate products; means for determining a core product from said candidate products; and, means for calculating the unified price based on a correlation coefficient between the core product and each of the candidate products, which are included in the bundle of products, and a standalone price of each of the candidate products.

The present invention contemplates a method for calculating a unified price for a bundle of products using a computer comprising the steps of:

calculating a linked usage correlation value among candidate products of a pool of candidate products;

determining a core product from said candidate products based on the linked usage correlation value; and, calculating the unified price based on a correlation coefficient between the core product and each of the candidate products, which are included in the bundle of products, and a standalone price of each of the candidate products.

The method and system calculates the likelihood (correlation coefficient) that a customer will purchase all of these candidate products in a single check-out (transaction) to determine a linked usage correlation value. The linked usage correlation value is indicative of purchase dynamics.

The method and system is constructed and arranged so that customers pay more for products they are likely to use, and less for products they are unlikely to use. The method and system of the present invention provides that proportioning.

The method and system of the present invention are particularly valuable where: the incremental or total value of bundle does not justify extensive primary research or testing, where time frames or market conditions do not allow such testing, where there are many bundle elements, or where individual product are low priced or low contribution.

The above and other objects and features of the present invention will become apparent from the drawings, the description given herein, and the appended claims.

BRIEF DESCRIPTION OF THE DRAWINGS

For a further understanding of the nature, objects, and advantages of the present invention, reference should be had to the following detailed description, taken in conjunction with the accompanying drawings, in which like reference numerals denote like elements, and wherein.

DETAILED DESCRIPTION OF THE PREFERRED EMBODIMENT

Definitions

Bundle—is a set of products which may previously (or potentially) have been sold separately, but are now combined into a combined multiple product offer (CMPO), for a unified price structure.

CMPO—combined multiple product offer.

Correlations of Purchase—is the same as the correlation coefficient.

Correlation Estimate—is the same as the correlation coefficient.

File—includes a data set associated with a particular formula, process, or subroutine.

Linked usage correlation value—same as total correlation value—same as total correlation product value.

Margin—includes similar measures such as gross margin, net margin, net profit, incremental cash contribution, and product Earnings Before Interest, Depreciation, Taxes and Amortization [EBITDA].

Product—includes a good or a service.

Set of Products—includes a plurality of goods, a plurality of services or a combination of at least one good and at least one service.

Unified—is a deliberate or explicit price relationship between the purchase of two or more products of the CMPO.

Automated Unified Pricing System

Figure 1:
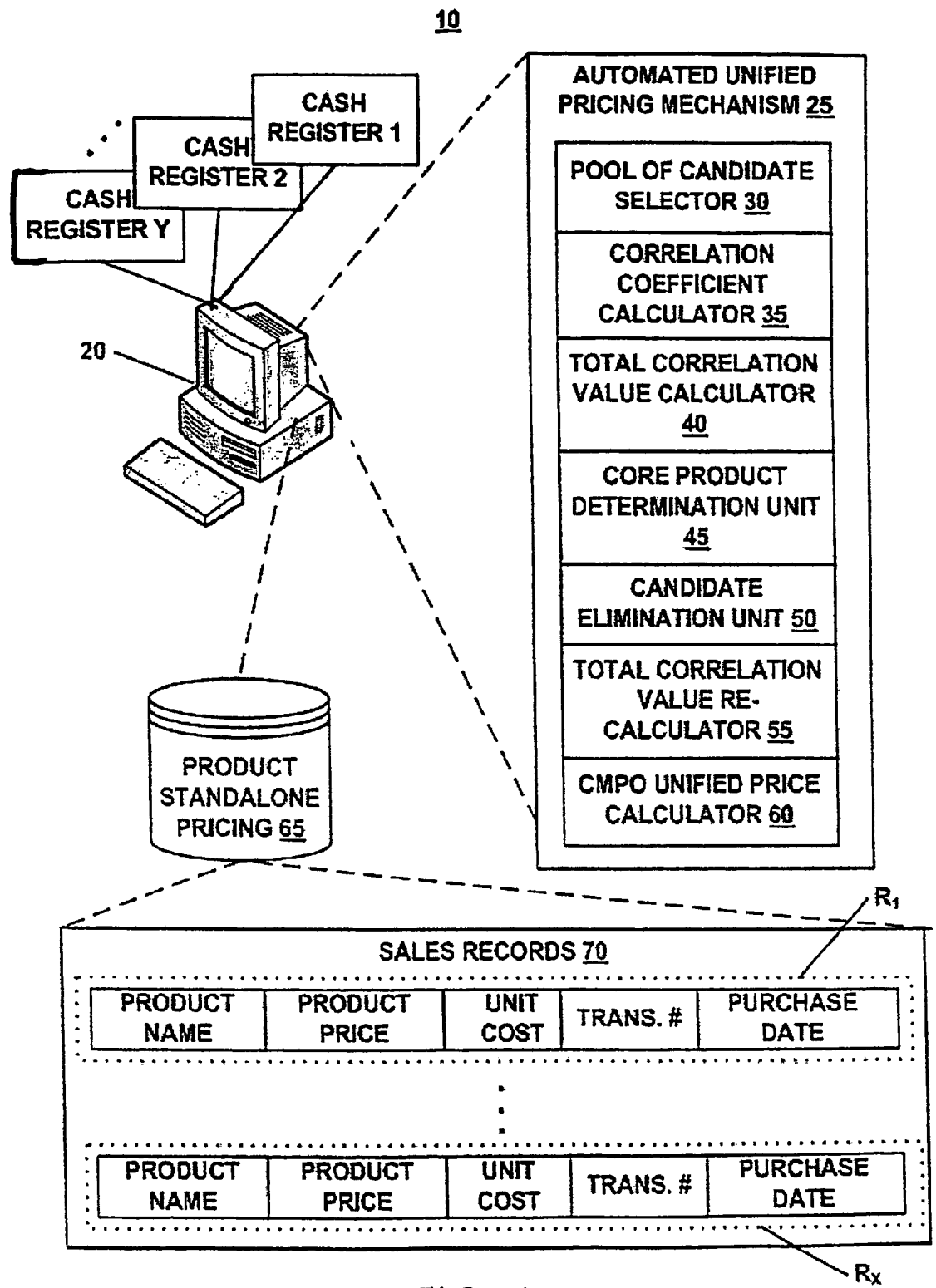
FIG. 1 illustrates a general block diagram of the automated unified pricing system for calculating the unified price for a CMPO in accordance with the present invention.

Referring now to FIG. 1, the automated unified pricing system in accordance with the present invention will be referenced by the numeral 10. The automated unified pricing system 10 includes, in general, an automated unified pricing mechanism 25 operated via a computer 20 or computing device to calculate a unified price for a combined multiple product offer (CMPO). The computer 20 or computing device is adapted to be interfaced to receive sales transaction data, such as without limitation, from cash registers 1, 2, . . . , Y in supermarkets, stores or businesses. The cash registers 1, 2, . . . , Y may be standalone devices or an e-cash register found at an e-Business (Website). An e-cash register may include an e-shopping cart and e-means of accepting electronic payment. A display device is associated with the computer.

The system 10 further includes a product standalone pricing database 65 which includes the sales records file 70. In the exemplary embodiment, the sale records R1, . . . , Rx may record the product name, product price (actual or estimated), unit cost (actual or estimated), transaction number and purchase date. As will be apparent from the description below other parameters may be added to the sales records R1, . . . , Rx to suit the user's needs for use in and access by the automated unified pricing mechanism 25. The sales records file 70 provides a means for recording and/or observing market trends.

Figure 2:
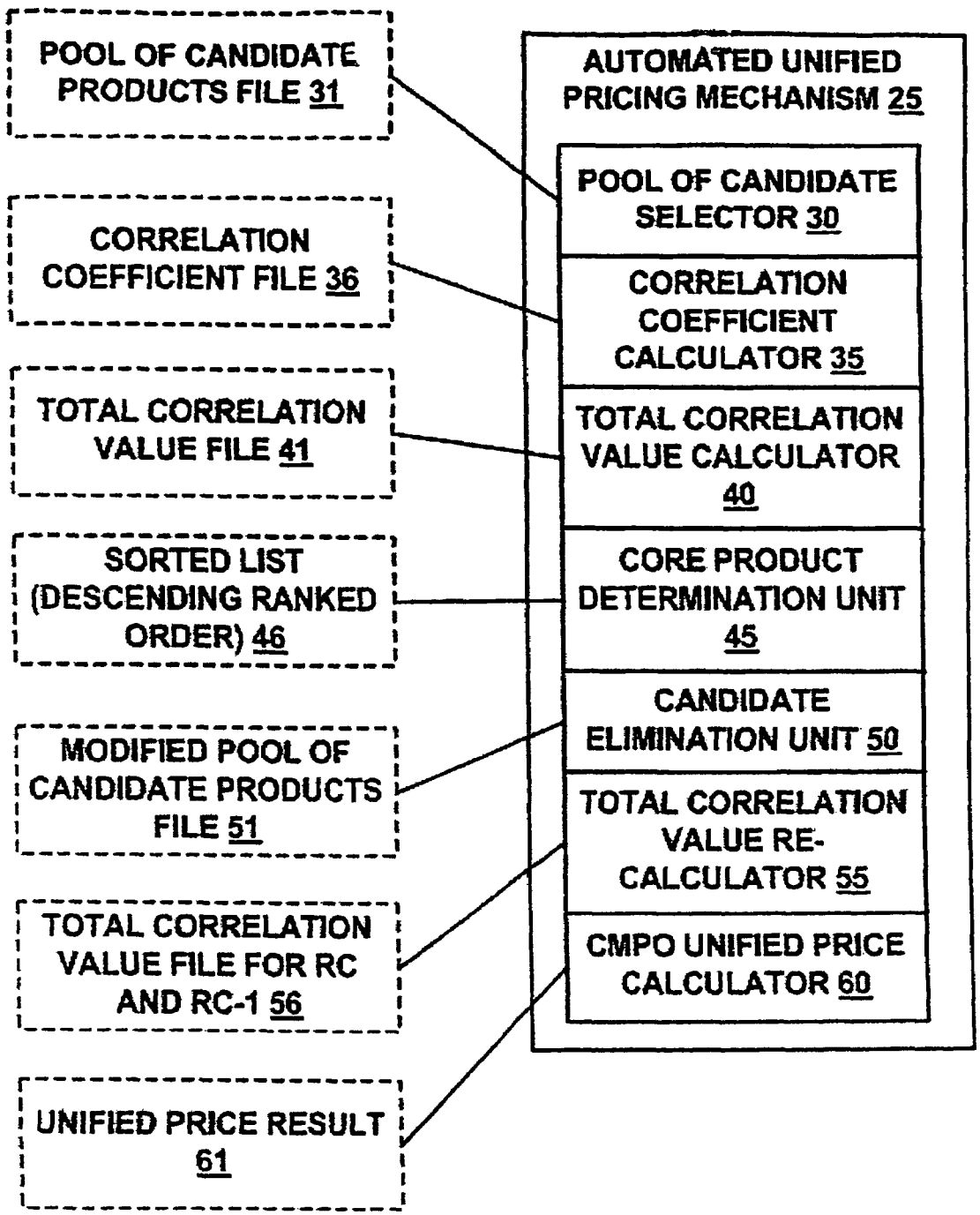
FIG. 2 illustrates resulting files of the automated unified pricing mechanism in accordance with the present invention.

Referring also to FIG. 2, the automated unified pricing (AUP) mechanism 25 is a means for automating the process for calculating a unified pricing for a CMPO. The AUP mechanism 25 includes a pool of candidates selector 30 for selecting a set of candidate products to be considered for evaluation in the CMPO. The set of candidate products is stored in a pool of candidate products file 31. The candidates selector 30 includes a user interface for selecting products from the sales records file 70 via computer 20 or a computing device. A variety of user interfacing techniques are available to enable the selection of multiple items from a global file or database (sales records file 70).

The AUP mechanism 25 further includes a correlation coefficient calculator 35 and total correlation value calculator 40 which create a correlation coefficient file 36. and a total correlation value file 41, respectively. As will be seen from the description below, the results in the correlation coefficient file 36 is used by the total correlation value calculator 40 to calculate the results for the total correlation value file 41. The total correlation value for a product represents its linked usage correlation value with other candidate products.

Additionally, the AUP mechanism 25 includes a core product determination unit 45 and a candidate elimination unit 50. The core product determination unit 45, in the exemplary embodiment, sorts the values in file 41 in descending order to form a sorted list 46. The candidate product with the highest correlation value in the sorted list 46 is set as the "core" product. Thereafter, products with correlation coefficients that are negative, zero or low are eliminated from the pool in file 31 to create a modified pool of candidate products file 51.

Furthermore, the AUP mechanism 25 includes a total correlation value re-calculator 55 that calculates (for a total correlation value file 56) the total correlation value for at least the "core" product using the correlation coefficients of those products in the modified pool of candidate products file 51. In the preferred embodiment, the total correlation value for the next highest product in the sorted list 46 is calculated, as well, for the total correlation value file 56.

Finally, the AUP mechanism 25 includes a CMPO unified price calculator 60 that calculates the unified price (UP) result 61 for the CMPO using the product with the highest total correlation value after re-calculation and those remaining candidate products in the modified pool of candidate products file 51.

Method Overview

Figure 3:
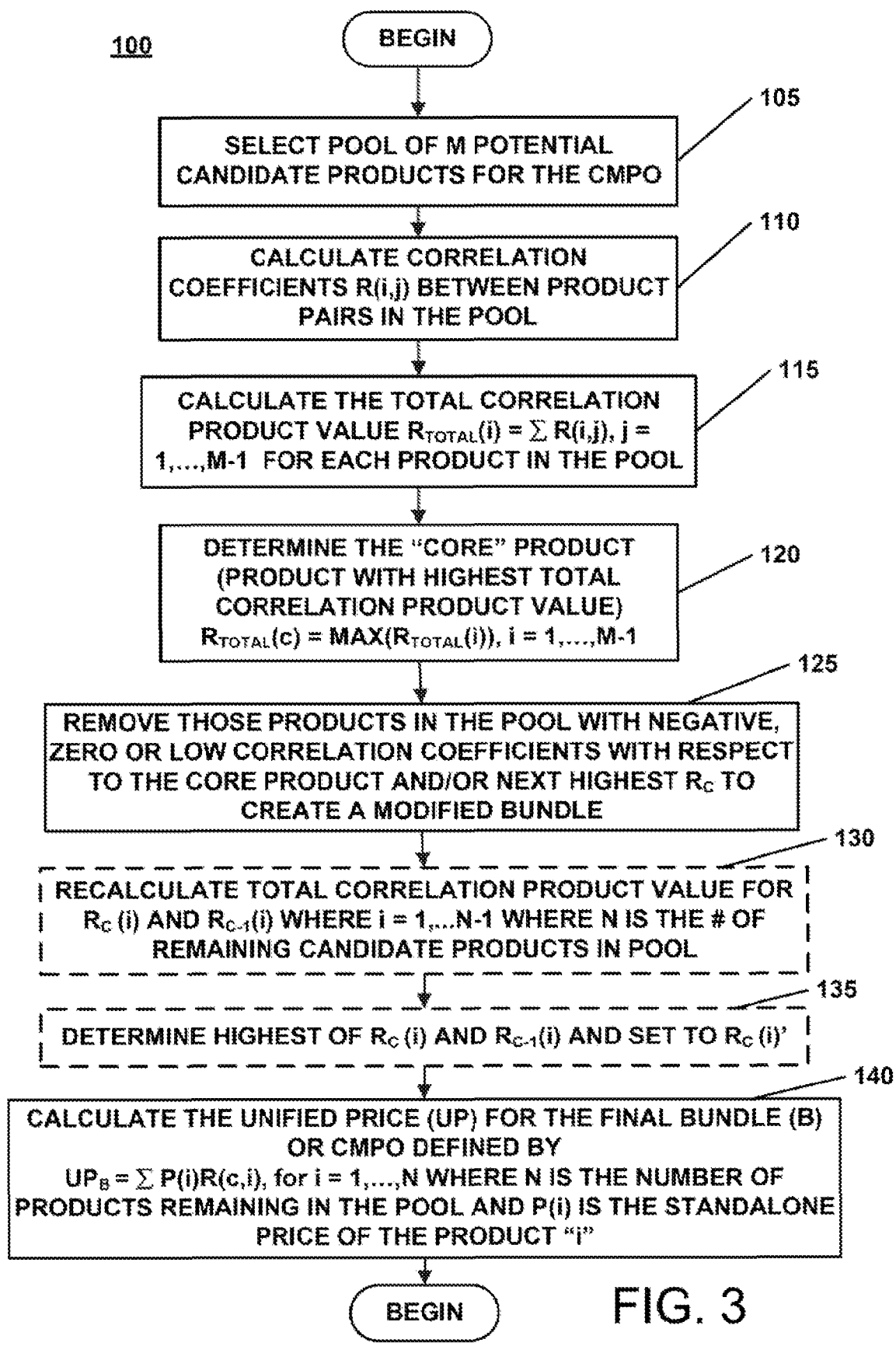
FIG. 3 illustrates a general flow diagram of the method for calculating the unified price for a CMPO in accordance with the present invention.

Referring now to FIGS. 1-3, the method 100 of the present invention allows companies to precisely calculate the unified price of a set of products when those products are offered together in a bundle or CMPO for such unified price. The method 100 is capable of being applied to situations where there is some observable or predicted market value to the bundle products (goods or services) sold individually, or to bundles which are a subset of a larger bundle being contemplated.

The method also provides a mathematical means for calculating a bundle's or CMPO's value, and therefore its respective unified price. The mathematical means (automated unified pricing mechanism 25) in accordance with the preferred embodiment of the present invention calculates, via a computer 20 or computing device, the bundle's or CMPO's value, and therefore provide a baseline for human adjustment, or for direct unified pricing of the bundle or CMPO.

The method 100 uses the pattern of joint purchases among candidate products of a pool for the bundle or CMPO to develop correlation coefficients of those purchases. Then, the correlation coefficients for the candidate products are used to calculate total correlation product values of the products in the bundle or CMPO and are used to establish a unified price.

The method 100 takes standalone prices for the products and then multiplies such standalone prices by correlation estimates (correlation coefficient) to estimate their value as part of a bundle. Thereafter, the method 100 adds together the value sum of the sum of the parts which creates an estimate of the total bundle value. The calculated value can then be used as the unified price, or the basis for price.

The rationale for this is that: a purchase pattern is indicative of how the value of products changes when they are combined into a bundle. The value of complimentary products is preserved when combined into a bundle and the value of substitute products is destroyed when combined into a bundle. The correlations of purchase (i.e. the correlation coefficients) show to what degree two products are compliments, or substitutes.

Method Applications

The method 100 of the present invention is applicable to all situations where a material proportion of the proposed bundle has established observable product prices in a market, or where component products have prices which can be estimated for a particular market. I have determined that the method 100 is particularly valuable where: 1) the incremental or total value of a bundle does not justify extensive primary research or testing; 2) time frames or market conditions do not allow such testing; 3) there are many bundle elements; or 4) individual products are low priced or low contribution.

Examples of such markets include: general merchandise, foods, toys, sports equipment, electronics, spare parts, information services, publishing, construction materials, travel services (e.g.: air freight and passengers), music recordings, computers, software, telephone services, most discrete-manufactured products, and any industry involved in "kitting."

For many products (especially when there are no independent sales of component parts or where there are no direct purchase amounts to correlate) "use" is a proxy for purchase patterns. ("Use" may mean the operation of a software program for the viewing of information online for customer-initiated action or physical usage of a machine.) The method 100 of the present invention applies here also, and correlations of usage are multiplied against the price of the independent components to provide the value implied by usage, and this is the basis for price.

The Method

Referring now to FIG. 3, the method 100 of the present invention will be described in detail below. The method 100 begins with Step 105 where a pool of M candidate products for inclusion in a bundle or CMPO is identified via the pool of candidate selector 30 and stored in the pool of candidate products file 35. Step 105 is followed by Step 110 where the correlation coefficients between product pairs in the product pool under consideration are calculated, by the correlation coefficient calculator 35, using standard statistical methods. Any common calculation of correlation coefficients may be used, such as without limitation, Pearson's Correlation Coefficient. The correlation coefficients are stored in a correlation coefficient file 36.

In the exemplary embodiment, the correlation coefficient between Product i and Product j is denoted as $R(i,j)$. By definition, the correlation to itself is always 1.00. The correlation coefficient calculation is a standard statistical calculation of correlation defined by:

$R(i,j)$ to calculate what is the relationship between purchases of a pair of candidate products of the pool, e.g. Product j being purchased along with Product i, in the same transaction or during the same time period. A transaction number in the sales records file 70 can be used to identify such products.

Step 110 is followed by Step 115 where a "total correlation" product value for each individual candidate product is calculated via the total correlation value calculator 40. In the exemplary embodiment, the total correlation product value $R_{total}(i)$ for Product is defined by the following formula:

$$R_{total}(i) = \Sigma R(i,j), j=1, \ldots, M-1 \quad \text{(Eq. 1)}$$

where, $R(i,j)$ is the correlation coefficient between Product i and Product j; "i" and "j" are the index of the products; and, M is the total number of items in the candidate product pool under consideration.

Step 115 is followed by Step 120 where the "core" product, i.e., the Product c, is determined from the candidate product pool. To determine the "core" product, a sort function, to form a sorted list 46 in descending order, is used to compare all $R_{total}(i)$ (Eq. 1) and find which candidate product has the highest total correlation product value ($R_{total}(c)$). The highest total correlation product value $R_{Total}(c)$ is defined by $$R_{total}(c) = \text{Max}(R_{total}(i), i=1, \ldots, M), \quad \text{(Eq. 2)}$$

Thus, the Product c is identified as the "core" product because $R_c = R_{Total}(C)$ which has the highest total correlation value. The correlation coefficients suggest which candidate products are most highly linked products from the point of view of the bundle, and which are less least linked products in the bundle.

Step 120 is followed by Step 125 where there are a number of negative correlation coefficients among purchases, it is worth removing those candidate products of the pool with a negative correlation coefficient to the $R_c$ (creating a modified pool of candidate products file 51) and the next highest total correlation value ($R_{c-1}$), and then re-running the sorting functions (after recalculating the total correlation value with the modified pool) for both Products c and c–1, in Step 130. In this way, negative correlation components (substitutes) do not confuse the result. In addition to negative correlations, zero correlations and low correlations may also be eliminated at Step 125. ("Low" correlation is defined relative to gross margins, and is discussed later.) The elimination step is preferred but may be optional.

To simplify the notation, in the following discussion, we denote the total correlation values for product i to product c and product i to product c–1 as $R_c(i) = \Sigma R(c,i), i=1, \ldots, N-1,$ $R_{c-1}(i) = \Sigma R(c-1,i), i=1, \ldots, N-1,$ where the number N, or the bundle product items, is either equal or smaller than M and is determined first by eliminating all bundle items that have negative or zero correlations to the core product.

Furthermore, in practice, a candidate product i can be taken out from the pool when its correlation value to the "core" product, $R(c,i)$, is one or more orders of magnitude smaller than the highest product correlation value to the core product. Another means for eliminating candidate products is to eliminate those where the correlation is less than (1—the percent margins enjoyed by the stand-alone product.) For instance, if gross margins for a candidate product are 40%, then it should not be included in bundles where it enjoys less than a 60% correlation to the "core" product. To do so would be to reduce profitability.

Note that the choice of margin (net, gross, incremental, etc.) will vary by the situation. Also the act of including the candidate product in the bundle will likely reduce the product's selling costs and so change it margin. Therefore, under a by-product cost accounting, one could use gross margins plus foregone sales costs. For instance, if gross margins are 40%, and savings due to the bundling are 20%, then the adjusted gross margins are 60%. Therefore, bundle elements with correlation coefficients of 0.4 (Correlation Coefficient$\geq$1–adjusted percent bundle margin) and higher would represent attractive products for inclusion in the CMPO.

With this approach, a typical field of bundle candidates may be reduced to contain many fewer (e.g. 5 products or less) in the bundle.

Step 130 is followed by Step 135 where the product with the highest re-calculated total correlation value is determined as the modified "core" product.

Step 135 is followed by Step 140 where with all the factors determined, the bundle product price $UP_b$ is calculated as $$UP_b = \Sigma P_{(i)} R_{(c,i)}, \text{ for } i=1, \ldots N \quad \text{(Eq. 3)}$$

where P(i) is the standalone price for the product "i".
$UP_b$ is the effective bundle price;
N is the total number of component products optimum in the bundle; and,
$R(c,i)$ is the correlation value for the core product c having the highest total correlation value from Step 135 and candidate product i of the bundle.

As can be readily seen, P(i) R(c,i) creates an adjusted product price for product i.

The same process can be repeated for members of M which were excluded from the final bundle set N, and this will often show a separate bundle which can be sold as a complement to the first bundle.

The rationale to method 100 is that most bundles are efforts by sellers to either increase the amount of money customers spend on their product, or to consolidate sales into one transaction, so that selling costs are reduced. By adjusting the individual product value by the purchase correlations, the customers will not be asked to pay too much, or too little, for the product. The sum of these adjusted values will represent a fair and acceptable price for the customer.

As can be readily seen the above method is superior to, and different from, the use of cross-sell data to determine bundle components. The percentage of customers who have purchased (e.g.) two different products, such as determined in cross-sell data, is not a good indication of bundle suitability. Cross-sell is in most cases a historical artifact of company sales efforts, while the correlation used by the present invention is indicative of purchase dynamics.

In simple terms: customers pay more for products they are likely to use, and less for products they are unlikely to use. The method of the present invention provides that proportioning.

Example 1

A Supermarket wishes to bundle together the ingredients required for a pancake breakfast. The candidate products (ingredients) and their prices are set forth in Table 1 below.

TABLE 1

| Bundle Element | Established Retail Price |
|---|---|
| Pancake Mix | $7.00 |
| Eggs | $2.00 |
| Maple Syrup | $6.00 |

The store takes records of sales from the sales records file 70 of these three candidate products for the last year, and calculates the likelihood (correlation coefficient) that a customer will purchase all of these candidate products in a single check-out (transaction). The results are set forth in Table 2 below.

TABLE 2

Table of Correlations (R) of Products at Checkout

|  | Pancake Mix | Eggs | Maple Syrup |
|---|---|---|---|
| Pancake Mix | 1.0 | 0.5 | 0.4 |
| Eggs |  | 1.0 | 0.1 |
| Maple Syrup |  |  | 1.0 |

In this example, the product which enjoys the highest total correlation value to the others is Pancake Mix (with a total correlation value of 0.5+0.4=0.9), versus Eggs (with a total correlation value of 0.1+0.5=0.6) and Maple Syrup (with a total correlation value of 0.4+0.1=0.5). Therefore, Pancake Mix is the "core" product.

Therefore, the total correlation values, which are most relevant are those comparing other candidate product total correlation values to Pancake Mix. Thus the Unified Price (UP) of the bundle or CMPO products are set forth below in Table 3.

TABLE 3

Table of Calculated Unified Price of the Bundle or CMPO

| Element | Market Price | Correlation Coefficient (R) | Bundle Value (Unified Price) |
|---|---|---|---|
| Pancake Mix | $7.00 | 1.0 | $7.00 |
| Eggs | $2.00 | 0.5 | $1.00 |
| Maple Syrup | $6.00 | 0.4 | $2.40 |
| Total |  |  | $10.40 |

Therefore, the calculated value/unified price in this market of a Pancake Bundle would be $10.40, although the separate standalone prices of the products are worth $15.00 ($7.00+$2.00+$6.00).

Refinement to the Method

Figure 4:
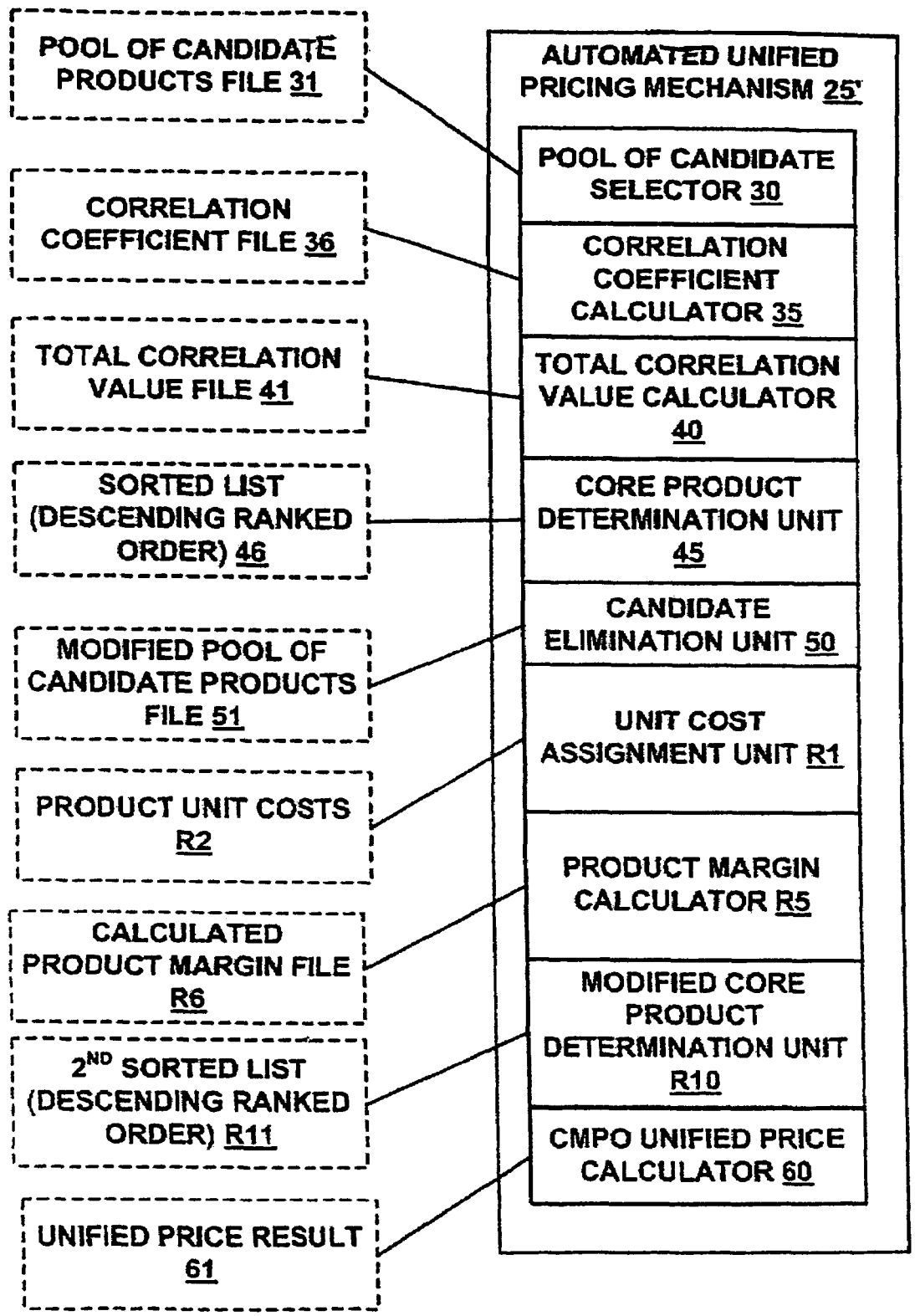
FIG. 4 illustrates an alternate embodiment of the automated unified pricing mechanism and resulting files in accordance with the present invention; and, FIG. 5 illustrate an alternate embodiment of the general flowchart.
Figure 5:
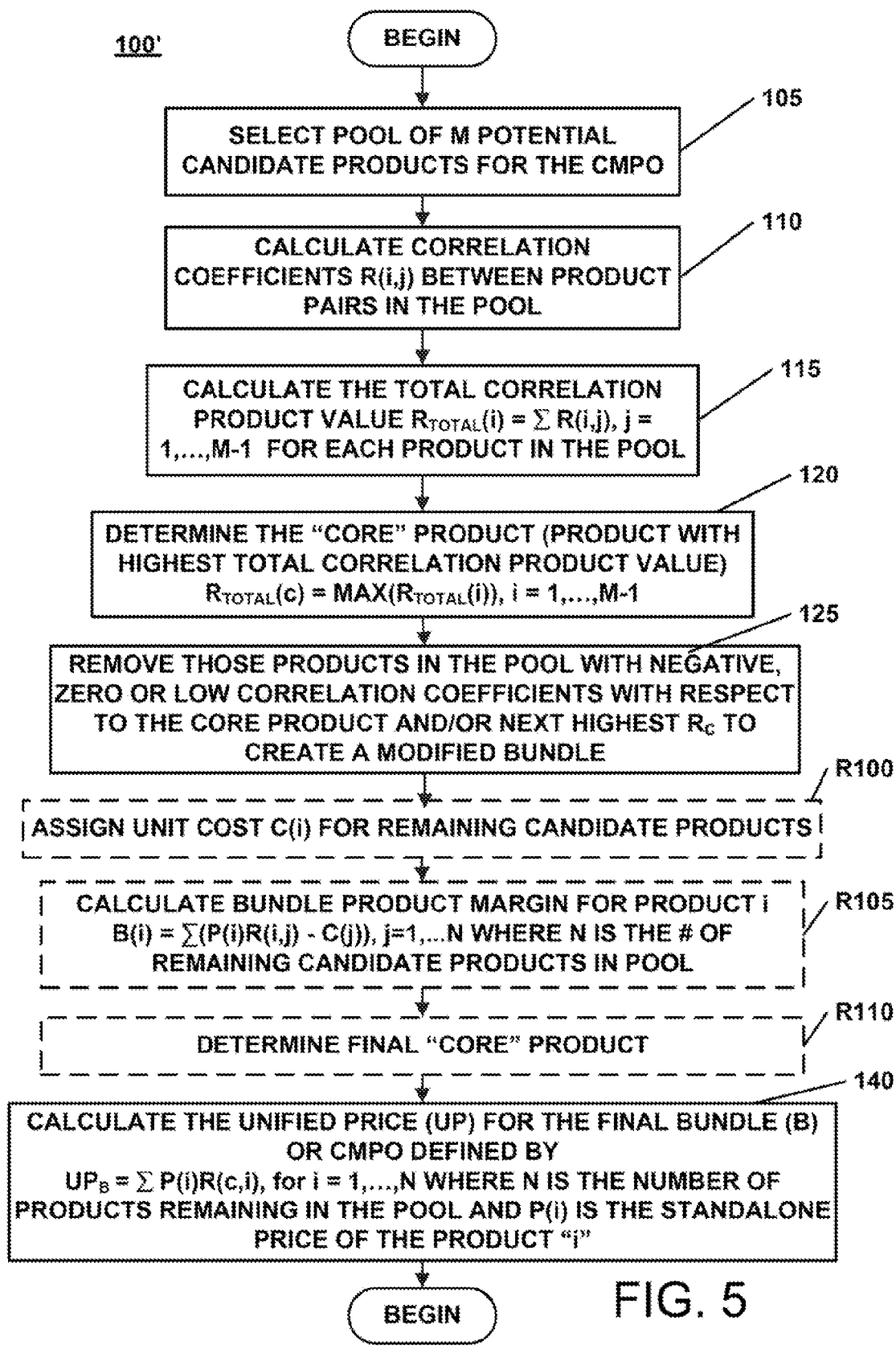

Referring now to FIGS. 4 and 5, a refinement to both method 100 and the automated pricing mechanism 25 is shown. The refinement determines bundle values based on margin contribution, rather than on revenues. The refined method 100' performs Steps 105, 110, 115, 120 and 125, above as in method 100. However, in the refined method 100', Steps 130 and 135 (shown in phantom in FIG. 3) of method 100 are substituted with Steps R100, R105 and R110 (shown in phantom in FIG. 5). The refined automated pricing mechanism 25' (FIG. 4) replaces the total correlation value re-calculator 55 (FIG. 2) with a unit cost assignment unit R1, product margin calculator R5 and Modified core product determination unit R10. The unit cost assignment unit R1 assigns product unit costs R2.

The refinement Steps R100, R105 and R110 are described below.

Step R100 includes assigning unit costs to each candidate product within the bundle. (Costs might be variable costs, total costs, cash costs, or incremental costs.) Such an assignment should allow conversion from revenues to margins. An example is set forth in Table 4.

TABLE 4

Margin Contribution calculated from Eq. 4 below

| Bundle Element | Retail Price | Unit Costs | Margin Contribution |
|---|---|---|---|
| Pancake Mix | $7.00 | 50% | $3.50 |
| Eggs | $2.00 | 10% | $0.20 |
| Maple Syrup | $6.00 | 75% | $4.50 |

Step R105 includes testing each candidate product in the bundle as if it were the "core" product. In other words, calculate bundle values based on correlation coefficients for each bundle element. This will yield as many total bundle values as there are products within the bundle. The methodology is similar (in part) to Step 140 above, but rather than calculate only the revenue "core" of the bundle, multiply each candidate product by 1.0 (to itself) and then the other products in the bundle by their correlation to the product being tested as the "core" product. The sum of these products is the bundle value for each product.

Step R110 includes choosing the bundle with the highest margin contribution (i.e. highest sum of the products). The bundle with the highest contribution would be appropriate if the objective is margin maximization.

In summary, the refinement is that we test each product within the bundle as the "core" product, using that bundle's correlations, to calculate which bundle provides the highest margins.

The specifics of Steps R100, R105 and R110 are set forth in more detail below. Again the following description follows closely the Steps outlined above in this section, which applies to the bundles in which for each product type, only single item is included in the product bundle.

At Step R100, the unit cost of product i is assigned value C(i), where i=1, . . . , N and N is the size of the modified pool of candidate products in file 51. The assigned costs R2 are assigned by the unit cost assignment unit R1.

Step R100 is followed by Step R105 where the bundle product margin B(i) for product i as if the product i is the "core" product is calculated by the product margin calculator R5 using the following formula:

$$B_{(i)}=\Sigma(P_{(j)}R_{(i,j)}-C_{(j)}), j=1,\ldots,N \qquad (\text{Eq. 4})$$

where P(j) is the price of product j; R(i,j) is the correlation coefficient between products and j; and c(j) is the unit cost of product j. The results are provided in the calculated product margin file R6.

Finally, Step R105 is followed by Step R110 where the modified "core" product is chosen by selecting, via the modified core product determination unit R10, the candidate product with the highest $B(c)_{max}$ using a typical sorting function (for a $2^{nd}$ sorted list R11 in descending order) below in Eq. 5:

$$B(c)_{max}=\text{Max}(B_{(i)}, i=1,\ldots,N), \qquad (\text{Eq. 5}).$$

Thus, the product c is identified as the "core" product for the formation of product bundle refined with the margin consideration. Then, the final product bundle price (unified price UP) can be calculated by following the equation (Eq. 3) as forth above in relation to method 100.

Example 2

Taking the same correlations used in the above example, the calculated margins available for each of the possible permutations is set forth in Tables 5-7 below.

TABLE 5

Taking Pancake Mix as the "core" product:

| Element | Market Price | Correlation (R) | Bundle Value | Unit Cost | Margin Contribution |
|---|---|---|---|---|---|
| Pancake Mix | $7.00 | 1.0 | $7.00 | $3.50 | $3.50 |
| Eggs | $2.00 | 0.5 | $1.00 | $1.80 | ($0.80) |
| Maple Syrup | $6.00 | 0.4 | $2.40 | $1.50 | $0.90 |
| Total | | | $10.40 | | $3.60 |

TABLE 6

Taking Eggs as the "core" product:

| Element | Market Price | Correlation (R) | Bundle Value | Unit Cost | Margin Contribution |
|---|---|---|---|---|---|
| Eggs | $2.00 | 1.0 | $2.00 | $1.80 | $0.20 |
| Pancake Mix | $7.00 | 0.5 | $3.50 | $3.50 | $0.00 |
| Maple Syrup | $6.00 | 0.1 | $0.60 | $1.50 | ($0.90) |
| Total | | | $6.10 | | ($0.70) |

TABLE 7

Taking Maple Syrup as the "core" product:

| Element | Market Price | Correlation (R) | Bundle Value | Unit Cost | Margin Contribution |
|---|---|---|---|---|---|
| Maple Syrup | $6.00 | 1.0 | $6.00 | $1.50 | $4.50 |
| Pancake Mix | $7.00 | 0.4 | $3.50 | $3.50 | $0.00 |
| Eggs | $2.00 | 0.1 | $0.20 | $1.80 | ($1.60) |
| Total | | | $9.70 | | $2.90 |

Therefore, in this example a bundle based around Pancake Mix would provide the highest contribution (i.e. the highest "Total" in the above Tables 5-7).

The rule here is to identify the bundle with the highest Margin Contribution calculated as the Market Price times the Correlation to the candidate core bundle element times the margin contribution (in percent) of each element.

This refinement applies particularly where there exists: a shortage of high-margin bundle elements, a channel limitation on bundle volume, e.g.: shelf space is rationed, or where bundle products have highly heterogeneous margins.

Note that in many instances, this technique would be used to delete negative contribution elements from the bundle.

Because many varying and differing embodiments may be made within the scope of the inventive concept herein taught and because many modifications may be made in the embodiments herein detailed in accordance with the descriptive requirement of the law, it is to be understood that the details herein are to be interpreted as illustrative and not in a limiting sense.

We claim:

1. An automated pricing system for calculating a unified price for a bundle of products comprising:

a computer; and a display device being associated with the computer, the computer being configured to:

calculate a linked usage correlation value $R_{total}(i)$ among candidate products of a pool of candidate products using a formula defined by $$R_{Total}(i)=\Sigma R(i,j), j=1,\ldots,M-1$$

for each candidate product i in the pool of candidate products where R(i,j) is a correlation coefficient between products i and j, said i and j each represents an index and M is a number of candidate products in the pool of candidate products;

determine a core product from said candidate products based on the linked usage correlation value wherein said core product has a highest total correlation value of the linked usage correlation values with all joint purchases in the pool of candidate products; and, calculate the unified price based on a correlation coefficient between the core product and each of the candidate products, which are included in the bundle of products, and a standalone price of each of the candidate products wherein the computer, when calculating said unified price, being configured to:

multiply, for said each of the candidate products included in the bundle of products, the standalone price of a respective one candidate product by the correlation coefficient related to a joint purchase of the core product and the respective one candidate product to calculate an adjusted product price for the respective one candidate product; and, adding together all adjusted product prices calculated for said each of the candidate products which are included in the bundle of products.

2. The automated pricing system according to claim 1, wherein said computer, when calculating said linked usage correlation value, being further configured to:
calculate a likelihood that a customer will purchase all of the candidate products in a single check-out transaction.

3. The automated pricing system according to claim 1, wherein said computer is further configured to:
determine an optimal core product and modify the pool of candidate products,
wherein said unified price is calculated using the optimal core product and those candidate products in the modified pool of candidate products.

4. The automated pricing system according to claim 3, wherein said computer, when determining the optimal core product, being further configured to:
eliminate those candidate products with at least one of a zero correlation coefficient, negative correlation coefficient or low correlation coefficient to the core product wherein said low correlation coefficient includes a correlation coefficient which is one of: (i) one or more orders of magnitude smaller than the highest total correlation value associated with the core product; (ii) less than a value calculated as 1 minus a percent margin of a candidate product with respect to the core product; and, (iii) less than 1 minus an adjusted percent bundle margin of a candidate product.

5. The automated pricing system according to claim 1, wherein said computer being further configured to:
modify the pool of candidate products by eliminating those candidate products with at least one of a zero correlation coefficient, negative correlation coefficient or low correlation coefficient in relation to the core product wherein said low correlation coefficient includes a correlation coefficient which is one of: (i) one or more orders of magnitude smaller than the highest total correlation value associated with the core product; (ii) less than a value calculated as 1 minus a percent margin of a candidate product with respect to the core product; and, (iii) less than 1 minus an adjusted percent bundle margin of a candidate product;
assign a unit cost for each candidate product in the modified pool of candidate products;
calculate a product margin B(i) for said each candidate product i defined by $$B(i)=\Sigma P(j)R(i,j)-C(j), j=1,\ldots N$$

where N is the size of the modified pool of candidate products, P(j) is the standalone price of product j, R(i,j) is the correlation coefficient between products i and j, C(j) is the unit cost of product j, and said i and j each represent an index; and,
select an optimal core product based on results of the product margin B(i),
wherein said unified price is calculated using the optimal core product and those candidate products in the modified pool of candidate products.

6. The automated pricing system according to claim 1, wherein said computer being further configured to:
record sales records over a predetermined period of time wherein said sales records are adapted to be used to calculate a likelihood that a customer will purchase all of the candidate products in a single check-out transaction.

7. A method for calculating a unified price for a bundle of products using a computer comprising the steps of:
calculating, by the computer, a linked usage correlation value among candidate products of a pool of candidate products;
determining, by the computer, an initial core product from said candidate products based on the linked usage correlation value;
modifying, by the computer, the pool of candidate products by eliminating those candidate products with at least one of a zero correlation coefficient, negative correlation coefficient or low correlation coefficient in relation to the initial core product wherein said low correlation coefficient includes a correlation coefficient which is one of: (i) one or more orders of magnitude smaller than a highest total correlation value associated with the core product; (ii) less than a value calculated as 1 minus a percent margin of a candidate product with respect to the core product; and, (iii) less than 1 minus an adjusted percent bundle margin of a candidate product;
assigning, by the computer, a unit cost for each candidate product in the modified pool of candidate products;
calculating, by the computer, a product margin B(i) for said each candidate product i defined by $$B(i)=\Sigma P(j)R(i,j)-C(j), j=1,\ldots N$$

where N is the size of the modified pool of candidate products, P(j) is a standalone price of product j, R(i,j) is a correlation coefficient between products i and j, C(j) is the unit cost of product j, and said i and j each represent an index;
selecting, by the computer, an optimal core product based on results of the product margin B(i); and,
calculating, by the computer, a unified price based on a correlation coefficient between the optimal core product and each of the candidate products in the modified pool of candidate products, which are included in the bundle of products, and a standalone price of said each of the candidate products.

8. The method according to claim 7, wherein said linked usage correlation value calculating step comprises the step of:
calculating a likelihood that a customer will purchase all of the candidate products in a single check-out transaction.

9. The method according to claim 7, wherein:
said initial core product has said highest total correlation value of the linked usage correlation values with all joint purchases in the pool of candidate products.

10. The method according to claim 9, wherein said unified price calculating step comprises the step of:
multiplying, for said each of the candidate products in the modified pool of candidate products included in the bundle of products, the standalone price of a respective one candidate product in the modified pool of candidate products by the correlation coefficient related to a joint purchase of the optimal core product and the respective one candidate product to calculate an adjusted product price for the respective one candidate product; and,
adding together all adjusted product prices calculated for said each of the candidate products in the modified pool of candidate products included in the bundle of products.

11. The method according to claim 7, further comprising the step of:
recording sales records over a predetermined period of time wherein said sales records are adapted to be used to calculate a likelihood that a customer will purchase all of the candidate products in a single check-out transaction; and
wherein the linked usage correlation value calculating step includes the step of calculating said likelihood.

12. An automated pricing system according to claim 9, wherein the linked usage correlation value calculating step calculates the linked usage correlation value $R_{Total}(i)$ using a formula defined by $$R_{Total}(i)=\Sigma R(i,k), k=1, \ldots, M-1$$

for each candidate product i in the pool of candidate products where R(i,k) is the correlation coefficient between products i and k, said i and k each represents an index in the pool of candidate products and M is a number of candidate products in the pool of candidate products.

13. An automated pricing system for calculating a unified price for a bundle of products comprising:
a computer; and,
an automated unified pricing device operated by the computer, the automated unified pricing device comprising:
a linked usage correlation value calculator configured to calculate a linked usage correlation value among candidate products of a pool of candidate products;
a core product determination unit configured to determine an initial core product from said candidate products based on the linked usage correlation value;
a candidate elimination unit configured to modify the pool of candidate products by eliminating those candidate products with at least one of a zero correlation coefficient, negative correlation coefficient or low correlation coefficient in relation to the initial core product wherein said low correlation coefficient includes a correlation coefficient which is one of: (i) one or more orders of magnitude smaller than a highest total correlation value associated with the core product; (ii) less than a value calculated as 1 minus a percent margin of a candidate product with respect to the core product; and, (iii) less than 1 minus an adjusted percent bundle margin of a candidate product;
a unit cost assignment unit configured to assign a unit cost to each candidate product in the modified pool of candidate products;
a product margin calculator configured to calculate a product margin B(i) for said each candidate product i defined by $$B(i)=\Sigma P(j)R(i,j)-C(j), j=1, \ldots N$$

where N is the size of the modified pool of candidate products, P(j) is a standalone price of product j, R(i,j) is a correlation coefficient between products i and j, C(j) is the unit cost of product j, and said i and j each represent an index;
a modified core product determination unit configured to select an optimal core product i based on results of the product margin B(i); and,
a unified price calculator configured to calculate the unified price as a direct function of a correlation coefficient between the optimal core product and each of the candidate products in the modified pool of candidate products, which are included in the bundle of products, and a standalone price of said each of the candidate products.

14. The automated pricing system according to claim 13, wherein said linked usage correlation value calculator being configured to:
calculate a likelihood that a customer will purchase all of the candidate products in a single check-out transaction.

15. The automated pricing system according to claim 13, wherein:
said initial core product has the highest total correlation value of the linked usage correlation values with all joint purchases in the pool of candidate products.

16. The automated pricing system according to claim 15, wherein said unified price calculator comprises:
a multiplier configured to, for said each of the candidate products in the modified pool of candidate products included in the bundle of products, multiply the standalone price of a respective one candidate product in the modified pool of candidate products by the correlation coefficient related to a joint purchase of the optimal core product and the respective one candidate product to create an adjusted product price for the respective one candidate product; and,
an adder configured to add together all adjusted product prices calculated for said each of the candidate products in the modified pool of candidate products included in the bundle of products.

17. The automated pricing system according to claim 15, wherein the linked usage correlation value calculator is configured to calculate the linked usage correlation value $R_{total}(i)$ using a formula defined by $$R_{Total}(i)=\Sigma R(i,k), k=1, \ldots, M-1$$

for each candidate product i in the pool of candidate products where R(i,k) is the correlation coefficient between products i and k, said i and k each represents an index in the pool of candidate products and M is a number of candidate products in the pool of candidate products.

18. The automated pricing system according to claim 13, further comprising:
a database configured to record sales records over a predetermined period of time wherein said sales records are adapted to be used to calculate a likelihood that a customer will purchase all of the candidate products in a single check-out transaction, wherein said likelihood is calculated by the linked usage correlation value calculator.

19. An automated pricing system for calculating a unified price for a bundle of products comprising:
a computer; and,
a display device associated with the computer, the computer being configured to:
calculate a linked usage correlation value $R_{Total}(i)$ among candidate products of a pool of candidate products using a formula defined by $$R_{Total}(i)=\Sigma R(i,j), j=1, \ldots, M-1$$

for each candidate product i in the pool of candidate products where R(i,j) is a correlation coefficient between products i and j, said i and j each represents an index and M is a number of candidate products in the pool of candidate products;
determine a core product from said candidate products based on the linked usage correlation value wherein said core product has a highest total correlation value of the linked usage correlation values with joint purchases in the pool of candidate products; and,
calculate the unified price based on a correlation coefficient between the core product and each of the candidate products, which are included in the bundle of products, and a standalone price of each of the candidate products.

20. A method for calculating a unified price for a bundle of products using a computer comprising the steps of:
calculating, by a computer, a linked usage correlation value $R_{Total}(i)$ among candidate products of a pool of candidate products using a formula defined by $$R_{Total}(i)=\Sigma R(i,j), j=1, \ldots, M-1$$

for each candidate product i in the pool of candidate products where R(i,j) is a correlation coefficient between products i and j, said i and j each represents an index and M is a number of candidate products in the pool of candidate products;

determining, by the computer, a core product from said candidate products based on the linked usage correlation value wherein said core product has a highest total correlation value of the linked usage correlation values with joint purchases in the pool of candidate products; and, calculating, by the computer, the unified price based on a correlation coefficient between the core product and each of the candidate products, which are included in the bundle of products, and a standalone price of each of the candidate products.

21. An automated pricing system for calculating a unified price for a bundle of products comprising:

a computer; and a display device associated with the computer, the computer being configured to:

calculate a linked usage correlation value among candidate products of a pool of candidate products;

determine an initial core product from said candidate products based on the linked usage correlation value;

modify the pool of candidate products by eliminating those candidate products with at least one of a zero correlation coefficient, negative correlation coefficient or low correlation coefficient in relation to the initial core product wherein said low correlation coefficient includes a correlation coefficient which is one of: (i) one or more orders of magnitude smaller than a highest total correlation value associated with the core product; (ii) less than a value calculated as 1 minus a percent margin of a candidate product with respect to the core product; and, (iii) less than 1 minus an adjusted percent bundle margin of a candidate product;

assign a unit cost for each candidate product in the modified pool of candidate products;

calculate a product margin B(i) for said each candidate product i defined by $$R_{Total}(i) = \Sigma P(j)R(i,j), j=1, \ldots, M-1$$

where N is the size of the modified pool of candidate products, P(j) is a standalone price of product j, R(i,j) is a correlation coefficient between products i and j, C(j) is the unit cost of product j, and said i and j each represent an index;

select an optimal core product based on results of the product margin B(i); and, calculate a unified price based on a correlation coefficient between the optimal core product and each of the candidate products in the modified pool of candidate products, which are included in the bundle of products, and a standalone price of said each of the candidate products.

22. An automated pricing system for calculating a unified price for a bundle of products comprising:

a computer; and, an automated unified pricing device operated by the computer, the automated unified pricing device comprising:

a linked usage correlation value calculator being configured to calculate a linked usage correlation value $R_{Total}$(i) among candidate products of a pool of candidate products using a formula defined by $$R_{Total}(i) = \Sigma R(i,j), j=1, \ldots, M-1$$

for each candidate product i in the pool of candidate products where R(i,j) is a correlation coefficient between products i and j, said i and j each represents an index and M is a number of candidate products in the pool of candidate products;

a core product determination unit configured to determine a core product from said candidate products based on the linked usage correlation value wherein said core product has a highest total correlation value of the linked usage correlation values with joint purchases in the pool of candidate products; and, a unified price calculator configured to calculate the unified price as a direct function of a correlation coefficient between the core product and each of the candidate products in the modified pool of candidate products, which are included in the bundle of products, and a standalone price of said each of the candidate products.

23. A method for calculating a unified price for a bundle of products using a computer comprising the steps of:

calculating, by a computer, a linked usage correlation value $R_{Total}$(i) among candidate products of a pool of candidate products using a formula defined by $$R_{Total}(i) = \Sigma R(i,j), j=1, \ldots, M-1$$

for each candidate product i in the pool of candidate products where R(i,j) is a correlation coefficient between products i and j, said i and j each represents an index and M is a number of candidate products in the pool of candidate products;

determining, by the computer, an initial core product from said candidate products based on the linked usage correlation value wherein the initial core product has a highest linked usage correlation value;

modifying, by the computer, the pool of candidate products by eliminating those candidate products with at least one of a zero correlation coefficient, negative correlation coefficient or low correlation coefficient in relation to the initial core product wherein said low correlation coefficient includes a correlation coefficient which is one of: (i) one or more orders of magnitude smaller than the highest total correlation value associated with the core product; (ii) less than a value calculated as 1 minus a percent margin of a candidate product with respect to the core product; and, (iii) less than 1 minus an adjusted percent bundle margin of a candidate product;

re-calculating, by the computer, a first linked usage correlation value for remaining candidate products in the modified pool of candidate products based on the initial core product and a second linked usage correlation value for the remaining candidate products in the modified pool of candidate products based on a product having a next highest linked usage correlation value;

selecting, by the computer, an optimal core product based on results of the recalculating step; and, calculating, by the computer, a unified price based on a correlation coefficient between the optimal core product and each of the candidate products in the modified pool of candidate products, which are included in the bundle of products, and a standalone price of said each of the candidate products.

24. A automated pricing system for calculating a unified price for a bundle of products comprising:

a computer; and, an automated unified pricing device operated by the computer, the automated unified pricing device comprising:

a linked usage correlation value calculator configured to calculate a linked usage correlation value $R_{Total}$(i) among candidate products of a pool of candidate products using a formula defined by $$R_{Total}(i) = \Sigma R(i,j), j=1, \ldots, M-1$$

for each candidate product i in the pool of candidate products where R(i,j) is a correlation coefficient between products i and j, said i and j each represents an index and M is a number of candidate products in the pool of candidate products;

a core product determination unit configured to determine an initial core product from said candidate products based on the linked usage correlation value wherein the initial core product has a highest linked usage correlation value;

a candidate elimination unit configured to modify the pool of candidate products by eliminating those candidate products with at least one of a zero correlation coefficient, negative correlation coefficient or low correlation coefficient in relation to the initial core product wherein said low correlation coefficient includes a correlation coefficient which is one of: (i) one or more orders of magnitude smaller than the highest total correlation value associated with the core product; (ii) less than a value calculated as 1 minus a percent margin of a candidate product with respect to the core product; and, (iii) less than 1 minus an adjusted percent bundle margin of a candidate product;

total correlation value re-calculator configured to re-calculate a first linked usage correlation value for remaining candidate products in the modified pool of candidate products based on the initial core product and a second linked usage correlation value for the remaining candidate products in the modified pool of candidate products based on a product having a next highest linked usage correlation value wherein an optimal core product is selected based on results of the total correlation value re-calculator; and, a unified price calculator configured to calculate a unified price based on a correlation coefficient between the optimal core product and each of the candidate products in the modified pool of candidate products, which are included in the bundle of products, and a standalone price of said each of the candidate products.

* * * * *